(12) United States Patent
Knittel

(10) Patent No.: US 8,088,465 B2
(45) Date of Patent: Jan. 3, 2012

(54) OPTICAL STORAGE MEDIUM WITH A MASK LAYER PROVIDING A SUPER RESOLUTION NEAR FIELD EFFECT, AND RESPECTIVE MANUFACTURING METHOD

(75) Inventor: Joachim Knittel, Tuttlingen (DE)

(73) Assignee: Thomson Licensing, Boulogne, Billancourt (FR)

( * ) Notice: Subject to any disclaimer, the term of this patent is extended or adjusted under 35 U.S.C. 154(b) by 397 days.

(21) Appl. No.: 12/448,955

(22) PCT Filed: Jan. 21, 2008

(86) PCT No.: PCT/EP2008/050602
§ 371 (c)(1),
(2), (4) Date: Jul. 16, 2009

(87) PCT Pub. No.: WO2008/090104
PCT Pub. Date: Jul. 31, 2008

(65) Prior Publication Data
US 2010/0062203 A1      Mar. 11, 2010

(30) Foreign Application Priority Data

Jan. 23, 2007   (EP) .................................... 07100977

(51) Int. Cl.
*B32B 3/02*   (2006.01)
(52) U.S. Cl. .................... 428/64.1; 428/64.4; 428/64.6; 430/270.12
(58) Field of Classification Search .................... None
See application file for complete search history.

(56) References Cited

U.S. PATENT DOCUMENTS

| 2005/0009260 | A1 | 1/2005 | Kim et al. | |
| 2008/0273447 | A1* | 11/2008 | Hyot et al. | 369/275.1 |

FOREIGN PATENT DOCUMENTS

| EP | 1403860 | 3/2004 |
| EP | 1724769 | 11/2006 |
| WO | WO2005/098843 | 10/2005 |

OTHER PUBLICATIONS

Chau et al: "Three-dimensional analysis of silver nano-particles doping effects on super resolution near-field structure", Optics Communications, North-Holland Publishing Co, Amsterdam, NL, vol. 269, No. 2, Nov. 23, 2006, pp. 389-394 XP005778150.
Search Report Dated Mar. 20, 2008.

* cited by examiner

*Primary Examiner* — Elizabeth Mulvaney
(74) *Attorney, Agent, or Firm* — Jeffrey D. Carter

(57) ABSTRACT

The optical storage medium, in particular a read-only optical disc, comprises a substrate layer, a read only data layer comprising a pit structure and being arranged on the substrate layer, a mask layer comprising nanoparticles for providing a super resolution near field effect, and a dielectric layer arranged between the data layer and the mask layer. The dielectric layer has a thickness, which changes in dependency of the pit structure and is for example a plastic layer having a completely flat surface for providing a uniform arrangement of the nanoparticles. For the manufacturing of a respective optical storage medium, the dielectric layer is arranged on the data layer advantageously by means of spin coating.

19 Claims, 2 Drawing Sheets

OPTICAL STORAGE MEDIUM WITH A MASK LAYER PROVIDING A SUPER RESOLUTION NEAR FIELD EFFECT, AND RESPECTIVE MANUFACTURING METHOD

This application claims the benefit, under 35 U.S.C. §365 of International Application PCT/EP2008/050602, filed Jan. 21, 2008, which was published in accordance with PCT Article 21(2) on Jul. 31, 2008 in English and which claims the benefit of European patent application No. 07100977.3, filed Jan. 23, 2007.

TECHNICAL FIELD OF THE INVENTION

The present invention relates to an optical storage medium, in particular an optical disc, which uses a super resolution near field effect for storing data with a high data density in a read-only region, and a method of manufacturing for a respective optical storage medium.

BACKGROUND OF THE INVENTION

Optical storage media are media in which data are stored in an optically readable manner, for example by means of a laser and a photo-detector being integrated within a pickup, the photo-detector being used for detecting the reflected light of the laser beam when reading the data. In the meanwhile a large variety of optical storage media are known, which are operated with different laser wavelength, and which have different sizes for providing storage capacities from below one Gigabyte up to 50 Gigabyte (GB). The formats include read-only formats such as Audio CD and Video DVD, write-once optical media such as CD-R and DVD-R, DVD+R, as well as rewritable formats like CD-RW, DVD-RW and DVD+RW. Digital data are stored on these media along tracks in one or more layers of the media.

The storage medium with the highest data capacity is at present the Blu-Ray disc (BD), which allows to store 50 GB on a dual layer disc. Available Blu-Ray formats are at present read only BD-ROM, re-writable BD-RE and write once BD-R discs. For reading and writing of a Blu-Ray disc an optical pickup with a laser wavelength of 405 nm is used. On the Blu-Ray disc a track pitch of 320 nm and a mark length from 2 T to 8 T+9 T is used, where T is the channel bit length, and which corresponds with a minimum mark length of 138-160 nm. The re-writable BD-RE disc is based on a phase change technology comprising a phase change layer, which uses for example a compound of AgInSbTe or GeSbTe. Further information about the Blu-Ray disc system is available for example from the Blu-Ray group via internet: www.bluraydisc.com.

New optical storage media with a super resolution near-field structure (Super-RENS) offer the possibility to increase the data density of the optical storage medium by a factor of four in one dimension as compared with the Blu-Ray disc. This is possible by a so-called Super-RENS structure, which is placed above a data layer of the optical storage medium, and which significantly reduces the effective size of a light spot used for reading from or writing to the optical storage medium. The super resolution layer is also called a mask layer because it is arranged above the data layer and only the high intensity center part of a laser beam can penetrate the mask layer.

The Super-RENS effect allows to record and read data stored in marks of an optical disc, which have a size below the resolution limit of a laser beam used for reading or writing the data on the disc. As known, the diffraction limit of the resolution of the laser beam is lambda/(2*NA), where lambda is the laser wavelength and NA the numerical aperture of the objective lens of the optical pickup.

A "Super-resolution and frequency dependent-efficiency of near-field optical disks with silver nanoparticles" is described by Ng and Liu, Optics Express, Vol. 13, No. 23, 14 Nov. 2005, p. 9422-9430. As described, silver nanoparticles in an $AgO_x$ layer generate near fields exhibiting a strongly local field enhancement around the nanoparticles due to localized surface plasmons. Sub-wavelength recording marks smaller than lambda/10 were distinguishable since the metallic nanoparticles transferred evanescent waves to detectible signals in the far field. The super-RENS disc studied by Ng and Liu includes a GeSbTe phase change material as a recording layer, an $AgO_x$ layer including a random distribution of silver nanoparticles imbedded in the $AgO_x$ layer, and two $ZnS$—$SiO_2$ dielectric layers as protective layers for the $AgO_x$ layer.

In US 2005/0009260 a recordable optical disk is described, which comprises a phase change layer or a metal layer as the data layer. As the mask layer a metal oxide layer or a layer of nanoparticles may be used, for example a layer with platin nanoparticles.

In EP 1724768 an optical storage medium is described which comprises a light-transmissible composite layer for providing a super-resolution effect, the composite layer containing nanoparticles with a high refractive index for increasing the refractive index of the composite layer. The composite layer may be applied by using spin coating.

A mask layer for a high-density near-field optical storage system, wherein the mask layer includes nanoparticles embedded in a nonlinear optical material to modify an index of refraction, is disclosed in WO 2005/098843.

BRIEF SUMMARY OF THE INVENTION

The optical storage medium according to the invention comprises a substrate layer, a read only data layer comprising a pit structure being arranged on the substrate layer, a mask layer providing a super resolution near field effect by utilizing nanoparticles, and a dielectric layer arranged between the data layer and the mask layer, which provides a defined, nonuniform distance between the mask layer and the pit structure of the data layer. The distance between the mask layer and the data layer, as defined by the dielectric layer, is in particular such, that it changes in dependence of the pit structure.

Preferentially nanoparticles are selected having properties such that the scattering cross section of the nanoparticles increases when they are close to a pit, which causes a strong interaction between the light scattered by the nanoparticles and the pits. Hence, there will be an increased signal modulation between the nanoparticles and the pits and therefore sub-diffraction limited pits can be detected.

The dielectric layer is in a preferred embodiment a plastic layer, which is arranged on the data layer by means of spin coating for providing a flat surface of the dielectric layer. The optical storage medium is in particular an optical disc being arranged for operation with a Blu-Ray pickup, in accordance with a pickup for the Blu-Ray disc system.

For a manufacturing of a respective optical disc first the substrate including the pit structure is manufactured, on which a reflective metallic layer is provided in a next step, for example by means of sputtering, for providing a read-only data layer. Then a dielectric layer is arranged on the data layer, which is applied in particular by means of spin coating, to get a completely flat surface for the mask layer. The thickness of the dielectric layer is therefore not uniform, because the thickness changes in dependency of the pit structure.

The advantage of the spin coating over for example sputtering is, that negative pits are filled up with material, respectively positive pits are surrounded by the dielectric material, and still a flat surface is provided for the mask layer, when a spin coating method is used. This is not the case by sputtering methods, because then the thickness of the layer would be essentially constant and therefore, a flat surface would not be obtained because of the pit structure.

BRIEF DESCRIPTION OF THE DRAWINGS

Preferred embodiments of the invention are explained now in more detail below by way of example with reference to schematic drawings, which show.

DETAILED DESCRIPTION OF PREFERRED EMBODIMENTS

Figure 1:
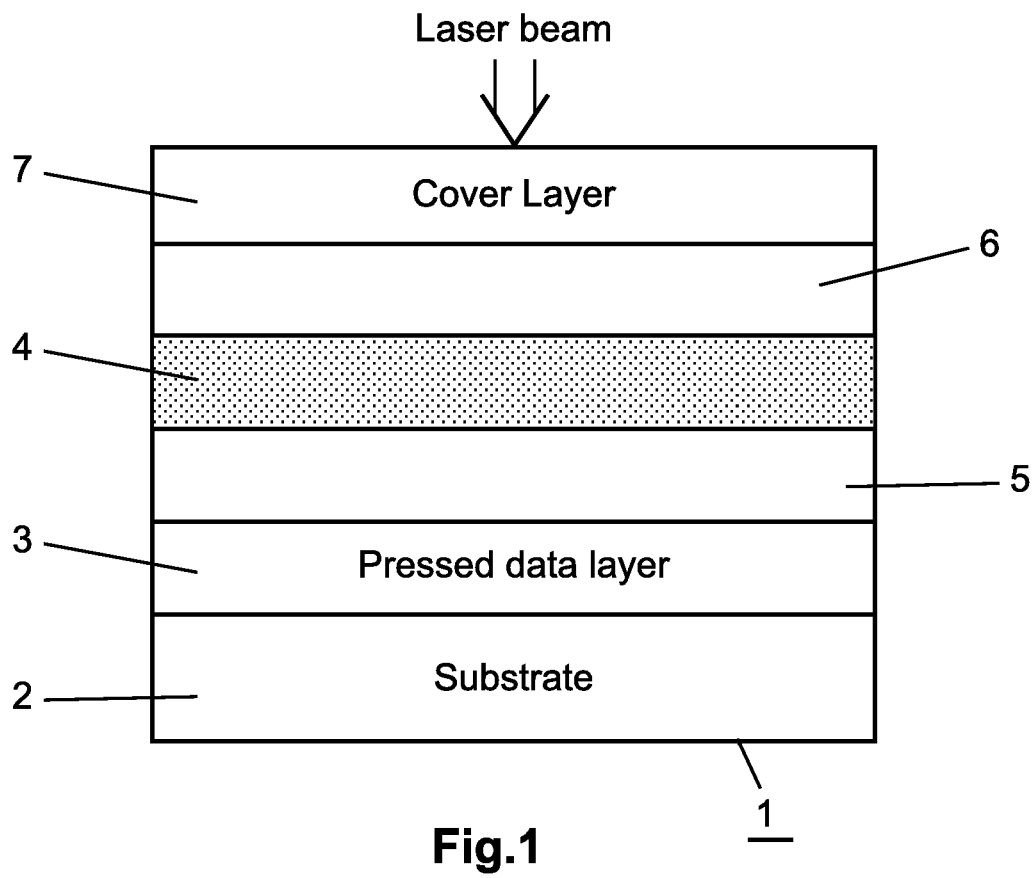
FIG. 1 an optical storage medium according to the invention in a cross-section.

An optical storage medium 1 is shown in a cross section in FIG. 1 in a simplified manner. On a substrate 2 a read-only data layer 3 is arranged comprising a reflective metallic layer, having a pit structure, for example an aluminum layer. On the data layer 3 a first dielectric layer 5 is arranged which consists for example of a plastic material. On the dielectric layer 5 a mask layer 4 is arranged which comprises nanoparticles for providing a superresolution near-field effect (Super-RENS).

The dielectric layer 5 is arranged with a flat surface, on which the nanoparticles are placed, and provides therefore a defined distance between the nanoparticles of the mask layer 4 and the data layer 3 in that the thickness changes in dependency of the pit structure. Above the mask layer 4 a second dielectric layer 6 is arranged, which comprises for example the material ZnS—SiO$_2$. As a further layer, a cover layer 7 is arranged on the dielectric layer 6 as a protection layer. For reading the data of the data layer 3, a laser beam is applied from the top of the storage medium 1, penetrating first the cover layer 7.

The optical storage medium 1 is in particular an optical disk. The read-only data layer 3 may have a pressed pit structure having positive marks or negative marks, as known from conventional ROM disks, for example DVDs and CDs.

Figure 2:
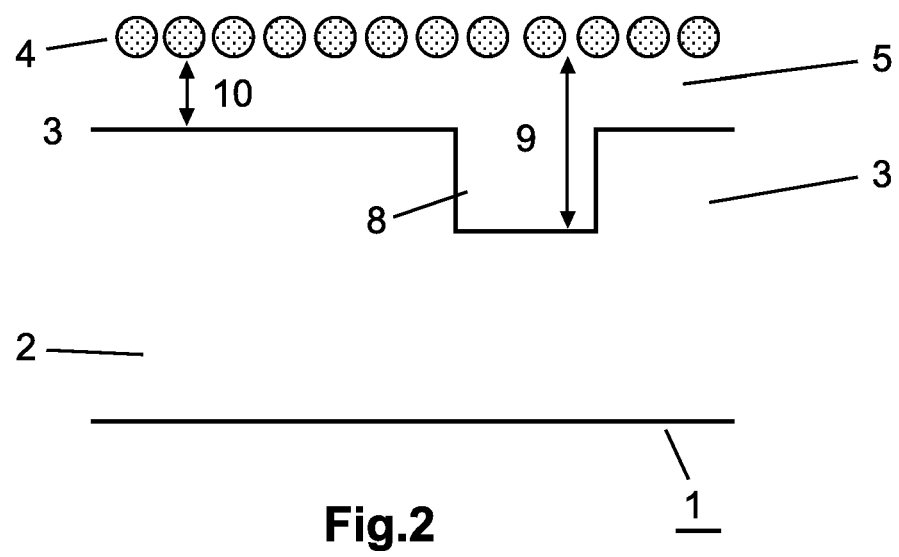
FIG. 2 a simplified diagram for illustrating the function of a mask layer comprising nanoparticles, FIG. 3 a second embodiment of the invention showing an optical storage medium comprising a read-only data layer with a negative pit structure, and FIG. 4 a third embodiment of the invention showing an optical storage medium comprising two mask layers including nanoparticles.

In FIG. 2 a first embodiment is shown comprising a data layer 3 having a pit structure with marks arranged as pits 8, which have for example a depth of larger than 30 nm, e.g. about 40 nm. The pits 8 of the data layer 3 can be manufactured for example by means of a stamper. The mask layer 4 with the nanoparticles is shown as dots being arranged in a uniform plane. The mask layer 4 may have a thickness for example in the range of 1-30 nm and the dielectric layer 5 a thickness in the range of 20-50 nm.

To obtain such a uniform plane of the mask layer 4, the dielectric layer 5 arranged between the data layer 3 and the mask layer 4 includes a completely flat surface for the nanoparticles of the mask layer 4. The distance between the nanoparticles of the mask layer 4 and the data layer 3 changes therefore when there is a pit 8 in the data layer 3. The distance 9 between the mask layer 4 and the bottom of the pit 8 is in particular larger than 50 nm and in case of no pit, the distance 10 is in particular less than 50 nm.

The properties of the nanoparticles will change therefore in dependency of the non-uniform thickness of the dielectric layer 5 and preferentially the properties of the nanoparticles are selected such that the scattering cross section of the nanoparticles increases when they are close to a pit. In this case there is a strong interaction between the light scattered by the nanoparticles and the pit and so the signal modulation due to the pits will be increased and subdiffraction limited pits can be detected, providing therefore a super-resolution near field effect.

It is assumed that the nanoparticles generate localized surface plasmons in dependency of the pit structure of the data layer, when irradiated by laser light, which leads to detectible signals in the far field, in correspondence with the nanoparticle effect of the AgO$_x$ layer, as described by the article "Super-resolution and frequency dependent-efficiency of near-field optical disks with silver nanoparticles" of Ng and Liu, as cited in the beginning of the description.

For reading the data of the read-only data layer 3, in particular a pickup with a blue laser diode having 405 nm in accordance with the Blu-ray disk system may be used. A laser with such a wavelength allows at present optical data disks with the highest possible data density. When a laser diode with a different wavelength is used, then the thickness of the dielectric layer 5 has to be changed accordingly.

Figure 3:
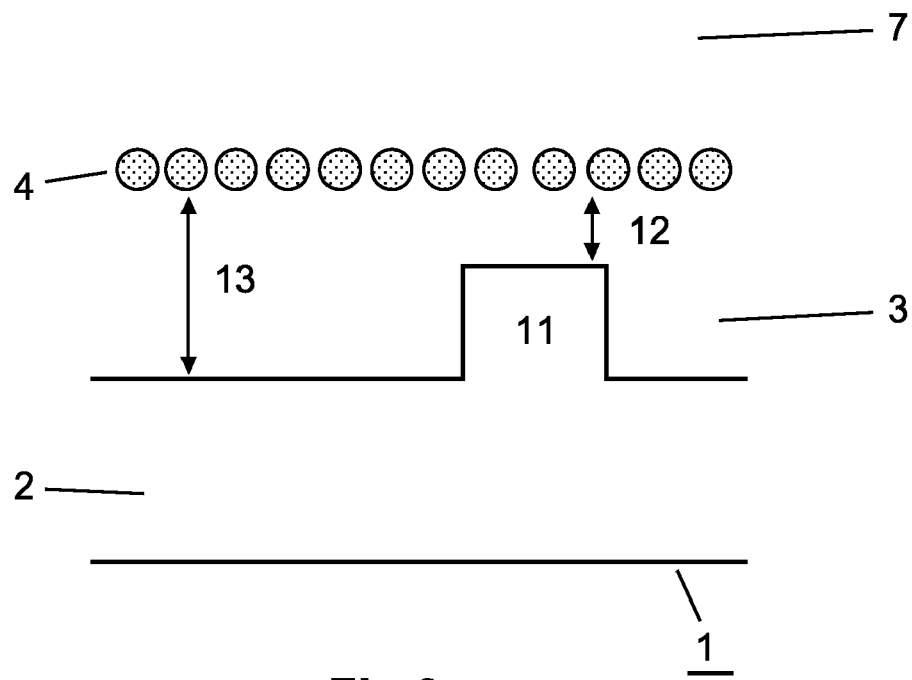

In FIG. 3 a second embodiment of the invention is shown comprising a data layer 3 with a negative pit structure, with pits 11 being arranged therefore as positive marks or bumps. The distance 12 between the pit 11 and the mask layer 4 is therefore small and the distance 13 correspondingly large. The dielectric layer 5 arranged between the mask layer 4 and the data layer 3 is also provided with a completely flat surface, on which the nanoparticles of the mask layer 4 are arranged.

For this embodiment, the data layer 3 comprises for example negative marks with a height of larger than 30 nm, e.g. 40 nm, and the distance 13 between the mask layer 4 and the data layer 3 is larger than 50 nm in case of no bump. The distance 12 is for example smaller than 50 nm between the mask layer 4 and the pit 11 present at a location of the data layer 3. The thickness of the dielectric layer 5 varies therefore in dependency of the pit structure between a minimum distance, e.g. in a range of 20-50 nm, and a maximum distance larger than e.g. 50-60 nm.

Figure 4:
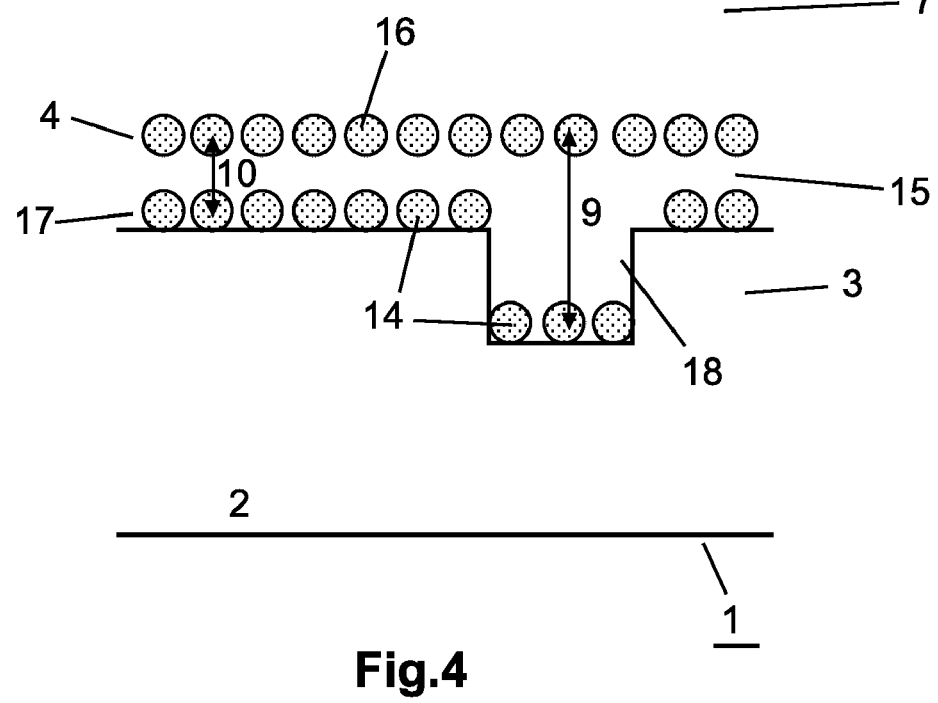

In FIG. 4 a further embodiment of the invention is shown, which comprises in addition to a first mask layer 4 a second mask layer 17 with nanoparticles 14 being arranged directly on the surface of the data layer 3. The nanoparticles 14 of the dielectric layer 13 are therefore located also on the bottom of the pits 18. Between the nanoparticles layers 17 and 4 a dielectric layer 15 is arranged having a flat surface to provide the arrangement of the nanoparticles 16 of the mask layer 4 in a uniform plane. The distances 9, 10 and the depth of the pits 18 can be similar to the values as used in the embodiment of the FIG. 2. The thickness of the second a mask layer 17 is in particular constant. The thickness of the dielectric layer 15 varies therefore also in dependency of the pit structure between a minimum distance and a maximum distance, in correspondence with the preceding embodiments.

For reading the data of the read-only data layer 3 of the optical storage media shown in FIG. 2-4, in particular a pickup with a blue laser diode having 405 nm in accordance with the Blu-Ray disk system may be used. A laser with such a wavelength allows at present optical data disks with the highest possible data density. When a laser diode with a different wavelength is used, then the thickness of the dielectric layer 5 has to be changed accordingly.

For the manufacturing of a storage medium 1, in particular an optical disk, first the substrate 2 including the pit structure is manufactured, on which a reflective metallic layer as the data layer 3 is arranged, for example by means of sputtering. For providing a dielectric layer 5 with a completely flat surface on the data layer 3, advantageously a spin coating method is used. A sputtering method cannot be used for the dielectric layer 5, because then the layer 5 would have a constant thickness, and would not provide therefore a flat surface for the mask layer 4 with the nanoparticles. The dielectric layer 5 is for example a thin plastic layer having a thickness value within the range of 20-50 nm, which can be easily manufactured by spin coating.

In a next step, the nanoparticles of the mask layer 4 are arranged on the dielectric layer 5, for example by means of sputtering. The mask layer 4 with the nanoparticles may be produced for example by reactive sputtering, as described in US 2005/0009260. Then, the cover layer 7 is arranged on the disk, for example by using a spin coating method. In addition, a second dielectric layer 6 between the mask layer 4 and the cover layer 7 may be arranged.

Also other embodiments of the invention can be made by a person skilled in the art without departing from the spirit and scope of the invention. The invention is in particular not limited to a storage medium for a use with a pickup unit comprising a Blu-Ray disc type pickup. The invention resides therefore in the claims herein after appended.

The invention claimed is:

1. Optical storage medium comprising
a substrate layer,
a read only data layer comprising a pit structure and being arranged on the substrate layer,
a mask layer comprising nanoparticles for providing a super resolution near field effect by generating surface plasmons when irradiated with a laser beam, and
a dielectric layer arranged between the data layer and the mask layer, wherein
the dielectric layer has a thickness, which changes in dependency of the pit structure.

2. The optical storage medium of claim 1, wherein the thickness of the dielectric layer is within a range of 20-50 nm.

3. The optical storage medium of claim 1, wherein the read only data layer is covered by a reflective metallic layer.

4. The optical storage medium of claim 1, wherein the data layer comprises positive pits with a pit depth of larger than 30 nm, the distance between the mask layer and the data layer being larger than 50 nm in case of a pit, and the distance between the mask layer and the data layer being smaller than 50 nm in case of no pit present at a location of the data layer.

5. The optical storage medium of claim 1, wherein the data layer comprises negative pits or bumps with a pit height of larger than 30 nm, the distance between the mask layer and the data layer being larger than 50 nm in case of no pit, and the distance being smaller than 50 nm between the mask layer and a pit present at a location of the data layer.

6. The optical storage medium of claim 1, wherein the dielectric layer comprises a flat surface for providing a defined distance between the mask layer and the data layer.

7. The optical storage medium of claim 6 wherein the dielectric layer is a plastic layer and is arranged on the data layer by means of spin coating.

8. The optical storage medium of claim 1, wherein the thickness of the mask layer is in a range of 1-30 nm, and wherein the nanoparticles included in the mask layer contain a noble metal.

9. The optical storage medium of claim 1, wherein the thickness of the dielectric layer varies in dependency of the pit structure between a minimum distance and a maximum distance.

10. The optical storage medium of claim 1, wherein the optical storage medium is a read-only optical disc.

11. Method for manufacturing an optical storage medium with the subsequent steps of
providing a substrate layer, on which a read-only data layer with a pit structure is arranged,
providing a dielectric layer, having a thickness, which changes in dependency of the pit structure,
providing a mask layer on the dielectric layer, wherein the mask layer comprises nanoparticles and
providing a cover layer as a protection layer on the mask layer.

12. The method of claim 11, wherein the dielectric layer is a plastic layer, which is arranged on the data layer by means of spin coating.

13. The method of claim 11, with the additional step of providing a second dielectric layer between the mask layer and the cover layer.

14. Optical storage medium comprising
a substrate layer,
a read only data layer comprising a pit structure and arranged on the substrate layer,
a mask layer comprising nanoparticles for providing a super resolution near field effect, and
a dielectric layer arranged between the data layer and the mask layer, wherein
the dielectric layer has a thickness, which changes in dependency of the pit structure.

15. The optical storage medium of claim 14, wherein the dielectric layer comprises a flat surface for providing a defined distance between the mask layer and the data layer.

16. The optical storage medium of claim 15, wherein the dielectric layer is a plastic layer and is arranged on the data layer by means of spin coating.

17. The optical storage medium of claim 14, wherein the nanoparticles included in the mask layer contain a noble metal, for generating a surface plasmon induced super-resolution effect, when irradiated with a laser beam.

18. The optical storage medium of claim 14, wherein a second a mask layer comprising nanoparticles for providing a super resolution near field effect is arranged on the read only data layer, between the data layer and the dielectric layer.

19. The optical storage medium of claim 18, wherein the second a mask layer has a constant thickness.

* * * * *